(12) United States Patent
Conforti

(10) Patent No.: US 6,663,152 B2
(45) Date of Patent: Dec. 16, 2003

(54) DETACHABLE EXTENSION HANDLE

(76) Inventor: Robert Joseph Conforti, 45 Peru Rd., Milton, Ontario (CA), L9T 2V6

( * ) Notice: Subject to any disclaimer, the term of this patent is extended or adjusted under 35 U.S.C. 154(b) by 0 days.

(21) Appl. No.: 10/207,153

(22) Filed: Jul. 30, 2002

(65) Prior Publication Data

US 2003/0025343 A1 Feb. 6, 2003

(51) Int. Cl.$^7$ ................................ B65O 25/28
(52) U.S. Cl. .............. 294/27.1; 294/149; 220/759
(58) Field of Search ................... 294/27.1, 31.2, 294/32, 33, 149, 153, 156; 220/737, 752, 754, 758, 759; 215/395, 396

(56) References Cited

U.S. PATENT DOCUMENTS

| | | | | |
|---|---|---|---|---|
| 1,825,897 A | * | 10/1931 | Brooke | 294/31.2 |
| 3,908,952 A | * | 9/1975 | Von Alven | 248/690 |
| 4,627,546 A | * | 12/1986 | Carranza | 215/396 |
| 4,724,971 A | * | 2/1988 | Henline | 215/396 |
| 4,796,937 A | * | 1/1989 | Andrea | 294/31.2 |
| D309,072 S | * | 7/1990 | Golkar | D7/622 |
| 5,749,490 A | * | 5/1998 | Keicher | 220/481 |

\* cited by examiner

*Primary Examiner*—Dean J. Kramer

(57) ABSTRACT

The present invention is an extension handle for use with containers having a pour spout. The extension handle consists of an elongated member having opposite first and second ends, with a spout retaining ring formed towards the first end and a handle formed towards the second end. The elongated member preferably consists of a flexible web like material which is sufficiently long to wrap at least part way around the outside of the container. The spout retaining ring may consist, of an aperture dimensioned to receive the spout. To accommodate containers of different sizes, the web may be provided with several apertures positioned adjacent each other towards the first end. The handle portion may be formed from a simple aperture positioned adjacent the second end of the web. The invention is well suited for use with gasoline containers, and provides the user with a mechanical advantage to aid in tilting the container to empty its contents.

2 Claims, 2 Drawing Sheets

DETACHABLE EXTENSION HANDLE

CROSS REFERENCE TO RELATED APPLICATIONS

Not Applicable

STATEMENT REGARDING FEDERALLY SPONSORED RESEARCH OR DEVELOPMENT

Not Applicable

REFERENCE TO SEQUENCE LISTING, TABLE, OR A COMPUTER PROGRAM LISTING COMPACT DISK APPENDIX

Not applicable

BACKGROUND OF THE INVENTION

1. Gasoline and diesel fuels are commonly used to power a variety of internal combustion engines.
2. These fuels power cars-trucks, commercial vehicles, military vehicles, farm equipment and a variety of other equipment. These vehicles are usually refueled by a hose coupled to a fuel dispensing pump; however, occasions often arise when a refueling pump is not conveniently located. On those occasions, an operator is required to manually refuel the vehicle by means of a fuel container. Several fuel containers, often called jerry cans, are available on the market.
3. These containers generally consist of a large cylindrical or cuboidal housing having a long spout on one side and a handle on another side. To empty the containers, they must be lifted and then tilted such that the contents of the containers empty through the pour spout. When filled with fuel, these containers can be quite heavy, and lifting the containers while tilting them can be a cumbersome task. The position of the handles on the containers make it difficult to pour out the contents; particularly if the container has to be lifted above the user's waist. Unfortunately, a majority of fuel containers on the market today do not provide handles to make the task of tilting the container easier.

BRIEF SUMMARY OF THE INVENTION

In accordance with the present invention, there, is provided an extension handle for use with containers having a pour spout. The extension handle provides a mechanical advantage to the user permitting the user to more easily empty the container by tilting it. The extension handle consists of an elongated member having a spout retaining means formed Towards one end of-the member and a handle formed towards the opposite end of the member. The spout retaining means is adapted to releaseably retain the spout portion of the container. Preferably, the elongated member is flexible and is sufficiently long to wrap around-the outside of the container.

With the foregoing in view, and other advantages as will become apparent to those skilled in the art to which this invention relates as this specification proceeds the invention is herein described by reference to the accompanying drawings forming a part hereof, which includes a description of the preferred typical embodiment of the principles of the present invention.

BRIEF DESCRIPTION OF THE SEVERAL VIEWS OF THE DRAWING

In the drawings like characters of reference indicate corresponding parts in the different figures.

DETAILED DESCRIPTION OF THE INVENTION

Figure 1:
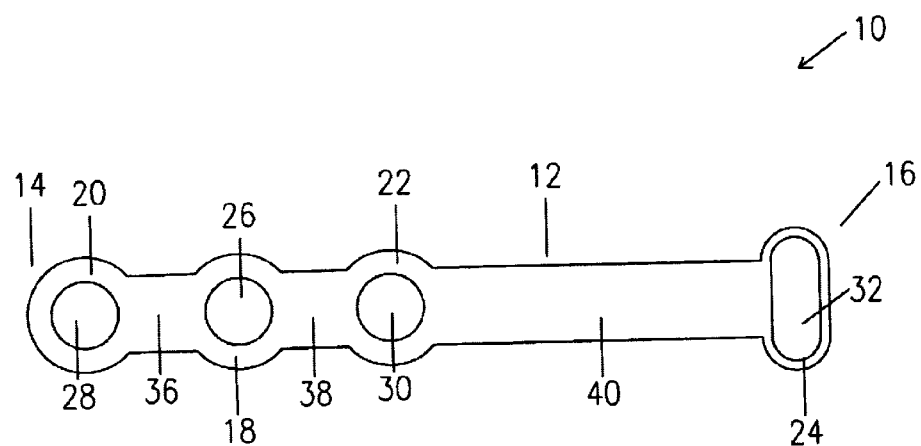
FIG. 1 is a top view of the extension handle.
Figure 2:
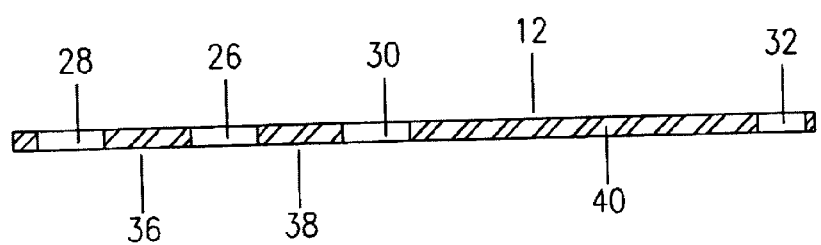
FIG. 2. is a side view of the extension handle taken in long section.

Referring firstly to FIGS. 1 and 2 the extension handle, shown generally as item 10, consists of an elongated member 12 having opposite ends 14 and 16. Spout retaining means 18, 20 and 22 are formed on elongated member 12 towards end 14. Handle 24 is formed on elongated member 12 towards end 16, Elongated member 12 preferably consists of a substantially flat web like material which is flexible. Preferably, elongated member 12 is made of flexible plastic material such as poly vinyl or poly ethylene. although any strong flexible material may be used. Since handle 10 is particularly well suited for use with gasoline containers, the material forming elongated member 12 should resist degradation by gasoline.

Spout retaining means 18,20 and 22 are adapted and configured to releasably retain the spout portion of a gas can (not shown). Preferably, spout retaining means 18,20 and 22 consist of apertures 26, 28 and 30 which are each dimensioned and configured to receive the spout Apertures 30, 22 and 28 are all positioned towards end 14 of elongated member 12. Handle portion 24 is formed from aperture 32 positioned adjacent end 16 of elongated member 12.

Aperture 32 is dimensioned to permit the user to grasp end 16 securely. Aperture 30 is separated from aperture 32 by portion 40. Apertures 30 and 26 are separated by portion 38 and apertures 28 and 26 are separated by portion 36.

Figure 3:
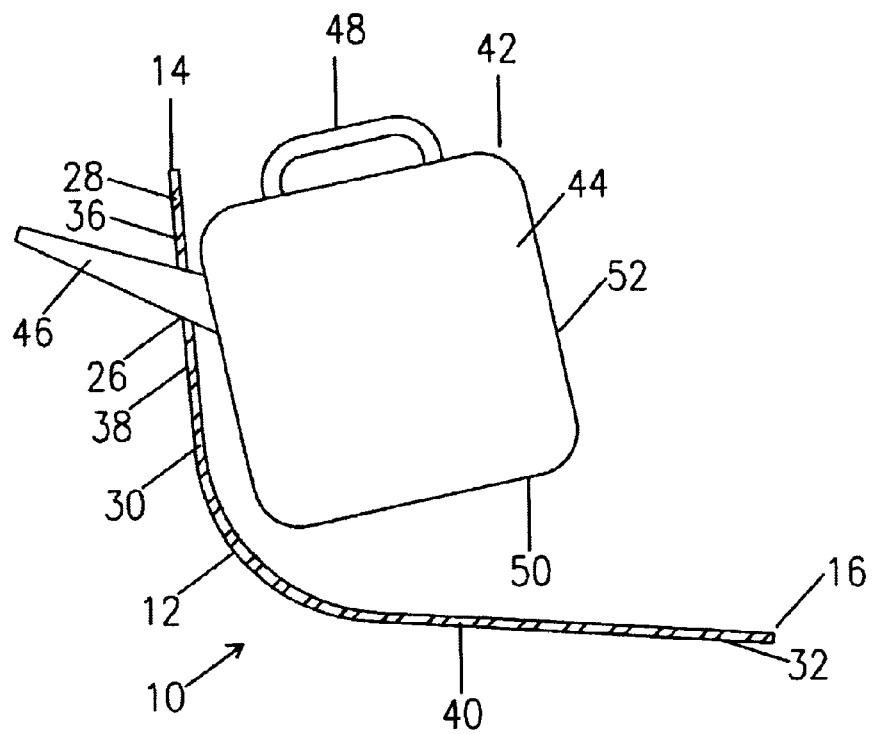
FIG. 3. is a side view of the extension handle being attached to a gasoline container, FIG. 4. is a side view of the extension handle being wrapped around the gasoline container for assisting in tilting the container.
Figure 4:
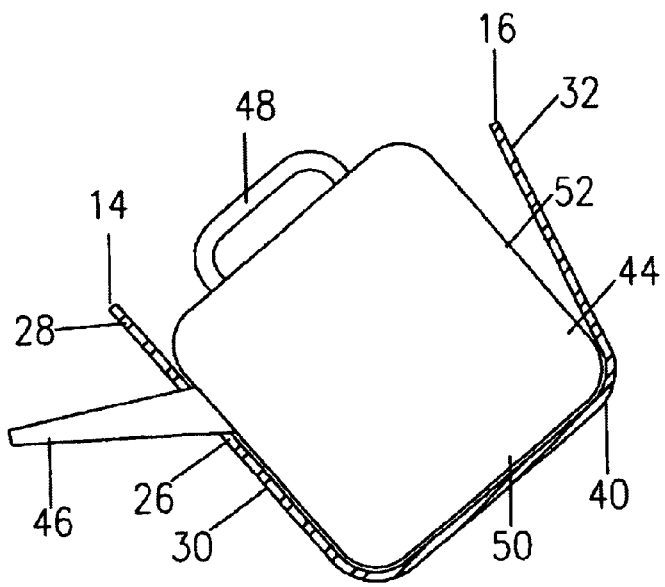

Referring now to FIGS. 3 and 4, extension handle 10 is used to give the user a mechanical advantage when lifting and tilting fuel container 42. Fuel container 42 consist of a container housing 44, a spout 46 and a handle 48. Apertures 30,26 and 28 are dimensioned to permit spout 46 to pass-through the apertures. Elongated member 12 is sufficiently long to permit the member to be wrapped at least part way around fuel container 42. Preferably elongated member 12 is sufficiently long such that when the member is attached to spout 46, the member can be wrapped below and then around bottom portion 50 of housing 44 to position handle 32 above bottom portion 50 as shown in FIG. 4. Preferably, handle 32 should be positioned towards back portion 52 of housing 44 at a point approximately mid way between bottom 50 and handle 48, If handle 32 is positioned too close to bottom 50, then it would be awkward to tilt the fuel container into a pouring position. Conversely, if handle 32 is positioned too close to handle 48, then handle device 10 would yield little mechanical advantage to a user.

Since fuel containers are available in a plurality of sizes (5 gallon, 10 gallon, etc.) the relative length of elongated member 12 between where it attaches to spout 46 and handle 32 can be lengthened simply by attaching the spout to an aperture closer to end 14. Hence, for a larger fuel container, the user can position handle 32 in the best location by passing spout 46 through aperture 28. Conversely, if a smaller fuel container is being used, the user may attach spout 46 at aperture 30. To ensure the correct placement of handle 32, portions 40, 38 and 36 of elongated member 12 should be approximately 18", 5" and 5" inches long, respectively. Since smaller fuel containers also have smaller spouts, aperture 30 may be made slightly smaller than aperture 28.

While the invention has been described specifically for use with fuel containers, it can be appreciated that the device can be used with a variety of containers used to dispense other liquids such as water or chemical solutions. Also, the present device may be used with a container having a cylindrical rather than cuboidal housing.

A specific embodiment of the present invention has been disclosed; however, several variations of the disclosed embodiment could be envisioned as within the scope of this invention.

It is to be understood that the present invention is not limited to the embodiments described above, but encompasses any and all embodiments within the scope of the following claims.

Therefore, what is claimed is:

1. An extension handle for use with rectangular type containers having a pour spout, the extension handle comprising:

(A) an elongated member having opposite first and second ends, (B) a handle provided at the second end to accommodate a persons hand, (C) three spout retaining means on the first end to fit over the spout, each spout retaining means spaced apart to accommodate different size containers.

2. An extension handle as defined in claim 1 wherein the elongated member is flexible and is adapted to wrap from the spout, down one side, along the bottom and part way up the opposite side.

* * * * *